United States Patent [19]

Mandelbaum et al.

[11] Patent Number: 5,552,897
[45] Date of Patent: Sep. 3, 1996

[54] SECURE COMMUNICATION APPARATUS AND METHOD

[75] Inventors: Richard Mandelbaum, Manalapan; B. Waring Partridge, III, Mendham, both of N.J.

[73] Assignee: AT&T Corp., Murray Hill, N.J.

[21] Appl. No.: 206,710

[22] Filed: Mar. 7, 1994

[51] Int. Cl.$^6$ .............................. H04N 1/00; H04N 1/44; G03G 21/00; G06F 7/04

[52] U.S. Cl. .................... 358/400; 358/434; 355/201; 380/18; 380/21; 380/23; 340/825.31; 340/825.34

[58] Field of Search .................. 358/400, 434, 358/407, 444; 355/201; 380/180, 23, 21; 340/825.34, 825.31; 375/95, 100, 200

[56] References Cited

U.S. PATENT DOCUMENTS

| | | | |
|---|---|---|---|
| 4,900,902 | 2/1990 | Sakakibara | 379/100 |
| 5,048,085 | 9/1991 | Abraham et al. | 380/23 |
| 5,191,611 | 3/1993 | Lang | 380/25 |
| 5,227,613 | 7/1993 | Takagi et al. | 380/21 |
| 5,258,998 | 11/1993 | Koide | 358/434 |
| 5,307,411 | 4/1994 | Anvret et al. | 380/21 |
| 5,353,124 | 10/1994 | Chou et al. | 358/468 |

*Primary Examiner*—Edward L. Coles, Sr.
*Assistant Examiner*—Kimberly A. Williams
*Attorney, Agent, or Firm*—John A. Caccuro

[57] ABSTRACT

A communication apparatus (e.g., a fax apparatus) provides secure message transmission by sending messages having an unrestricted portion (e.g., a header) and a restricted portion (e.g., the body of the message). The unrestricted portion is always outputted at the receiving apparatus; however, access to the restricted portion is provided only in response to receiving predetermined information from a user (e.g., a message recipient). This information may include either the use of a password or the use of a PIN code following the insertion of a user's smart card into the receiving apparatus. If the restricted portion is encrypted, the user must either provide the decryption key to enable the receiving apparatus to decrypt the restricted message or his/her smart card must perform the actual decryption of the restricted message.

12 Claims, 6 Drawing Sheets

RECIPIENT LIST – TABLE 401

| ITEM | NAME | FAX NO. | PHONE NO. | PUBLIC KEY |
|---|---|---|---|---|
| 1 | RECIPIENT 1 | ~ | ~ | $K_{RP1}$ |
| . | . | . | . | . |
| . | . | . | . | . |
| . | . | . | . | . |
| N | RECIPIENT N | ~ | ~ | $K_{RPN}$ |

SMART CARD OWNER'S DATA – TABLE 402

NAME
PUBLIC KEY = $K_P$
PRIVATE KEY = $K_S$
PIN NUMBER = PASSWORD
FAX NO.

TYPICAL HEADER MESSAGE 403

| RECIPIENT & FAX NO. | DATA/TIME | SENDER & FAX NO. | SENDER'S PUBLIC KEY $K_{SP}$ | MESSAGE NUMBER | RESTRICT FLAG | RECIPIENT PUBLIC KEY $K_{RP}$ ENCRYPT FLAG | SENDER'S PRIVATE KEY $K_{SS}$ ENCRYPT FLAG | SPECIAL PASSWORD |
|---|---|---|---|---|---|---|---|---|
| RECIPIENT 1 | ~~~~ | ~~~ | ~ | 1 | 1 | 0 | 1 | ~ |

HEADER MESSAGES – TABLE 404

| RECIPIENT & FAX NO. | DATA/TIME | SENDER & FAX NO. | SENDER'S PUBLIC KEY $K_{SP}$ | MESSAGE NUMBER | RESTRICT FLAG | RECIPIENT PUBLIC KEY $K_{RP}$ ENCRYPT FLAG | SENDER'S PRIVATE KEY $K_{SS}$ ENCRYPT FLAG |
|---|---|---|---|---|---|---|---|
| RECIPIENT 1 | ~~~~ | ~~~ | ~ | 1 | 1 | 0 | 1 |
| RECIPIENT 2 | ~~~~ | ~~~ | ~ | 1 | 1 | 1 | 0 |
| RECIPIENT 1 | ~~~~ | ~~~ | ~ | 2 | 0 | 0 | 0 |
| RECIPIENT 1 | ~~~~ | ~~~ | ~ | 3 | 1 | 0 | 0 |

405, 406, 407, 408

RECIPIENT LIST – TABLE 410

| NAME | LOGIN | PASSWORD | SPECIAL PASSWORD |
|---|---|---|---|
| RECIPIENT 1 | ~~~ | ~~~ | ~~~ |
| RECIPIENT 2 | ~~~ | ~~~ | ~~~ |
| ⋮ | ⋮ | ⋮ | ⋮ |
| RECIPIENT M | ~~~ | ~~~ | ~~~ |

FIG. 5

SECURE COMMUNICATION APPARATUS AND METHOD

TECHNICAL FIELD

This invention relates to communication apparatuses and, more particularly, to a secure communication apparatus and method of communicating messages.

BACKGROUND OF THE INVENTION

Today, facsimile machines are becoming commonplace in many business offices. The new facsimile machines offer a variety of features which enhance their usefulness. One common feature of prior art facsimile machines enables the automatic reception of messages even when an addressee is not present. However, because anyone can read the received facsimile message, a security problem may exist when private or personal facsimile information is received.

U.S. Pat. No. 5,191,611 issued to G. S. Lang on Mar. 2, 1993 describes a method and apparatus for protecting material on storage media by limiting access to the storage medium. More specifically, the storage medium is divided into sectors and each sector is assigned to a specific user. Access to that sector of the storage medium can be gained only when the appropriate sequence of signals is executed. More particularly, Lang contemplates using a smart card as the device that a user will use to gain access to the storage medium. The smart card contains an encryption key and processing power, and the two combine to interact with the computer that guards the storage medium.

In one embodiment his invention, shown in FIG. 6 of the above-identified patent, Lang describes a facsimile apparatus (FIG. 6) for secure computerized fax (SCFAX) delivery. The sender loads a message/document to be transmitted, enters the sender's smart card, and enters the recipient's address. The recipient's fax machine is informed of the recipient's identity and that fax machine stores the information in the proper storage medium sector. In accordance with the above description, the storing of the fax data in a particular sector insures proper delivery.

In a more secure embodiment, the data itself is encrypted, either with a commonly known encryption key, or with the recipient's public key. The encryption is accomplished with the sender interfacing his/her smart card with the sending fax machine.

The problem with the Lang approach is that the recipient fax machine must know, before hand, of the identities of the people who will receive confidential faxes, so that the faxes can be stored in memory sectors associated with those people. In practice, the opposite is more likely. That is, a fax machine that is situated in a one-person office and communicates faxes to that individual does not need enhanced confidentiality, since no one else has access to the fax machine. A fax machine that is open to the public or is "semi-open" to the public, on the other hand, could greatly benefit from enhanced confidentiality but will not know, beforehand of the identity of those desiring to use the fax machine.

SUMMARY OF THE INVENTION

This invention provides the desired enhanced confidentiality of message communications (e.g., fax documents) by providing unrestricted access to part of the message transmission (e.g., a header message) and a restricted access to the remainder of the message. The unrestricted portion identifies the message recipient and indicates the existence of a restricted portion of the message. Access to the restricted portion, illustratively, requires one or more of the following: submitting a password to the receiving apparatus and using the appropriate key for decrypting the restricted portion (when the restricted portion has been previously encrypted by the sender). For these two approaches, processing power is needed at the recipient's apparatus, and that power is provided by a processor within the apparatus or, if a higher level of security is desired, by a smart card possessed by the recipient.

In one arrangement, all but a header message portion (which identifies an intended recipient) of a received message is restricted and, optionally, encrypted using either a public key, $K_{RP}$, of an intended recipient of the message or a sender's private or secret key, $K_{SS}$. The outputted header message portion informs the recipient (and all who care to know) of the receipt of a restricted (unencrypted or encrypted) message. Access to the restricted message (and decrypting, if necessary) is available after either 1) the recipient completes a login and password process or 2) the recipient inserts his/her smart card into the apparatus and enters a personal security code which is authenticated by the apparatus. According to another feature of the invention, the recipient can select which of a plurality of received stored encrypted messages is to be decrypted and outputted.

The present invention also enables a message sender to insert a smart card and access an "address book" within it. The sending apparatus displays the addressee list (name and number) obtained from the sender's smart card and enables the sender to select a recipient (and various encryption keys) to whom the sender's message is to be sent. The sender's message may then be encrypted using the recipient's public key $K_{RP}$ or sender's private key $K_{SS}$ and sent to the recipient's apparatus.

DETAILED DESCRIPTION

At the outset, it should be noted that while the present invention is illustratively described for use in a facsimile (fax) apparatus (FIG. 1), it can, more generally, be readily adapted for use in a multi-media apparatus wherein voice, text, fax, graphics or video messages may be sent between a sender and recipient locations.

Figure 1:
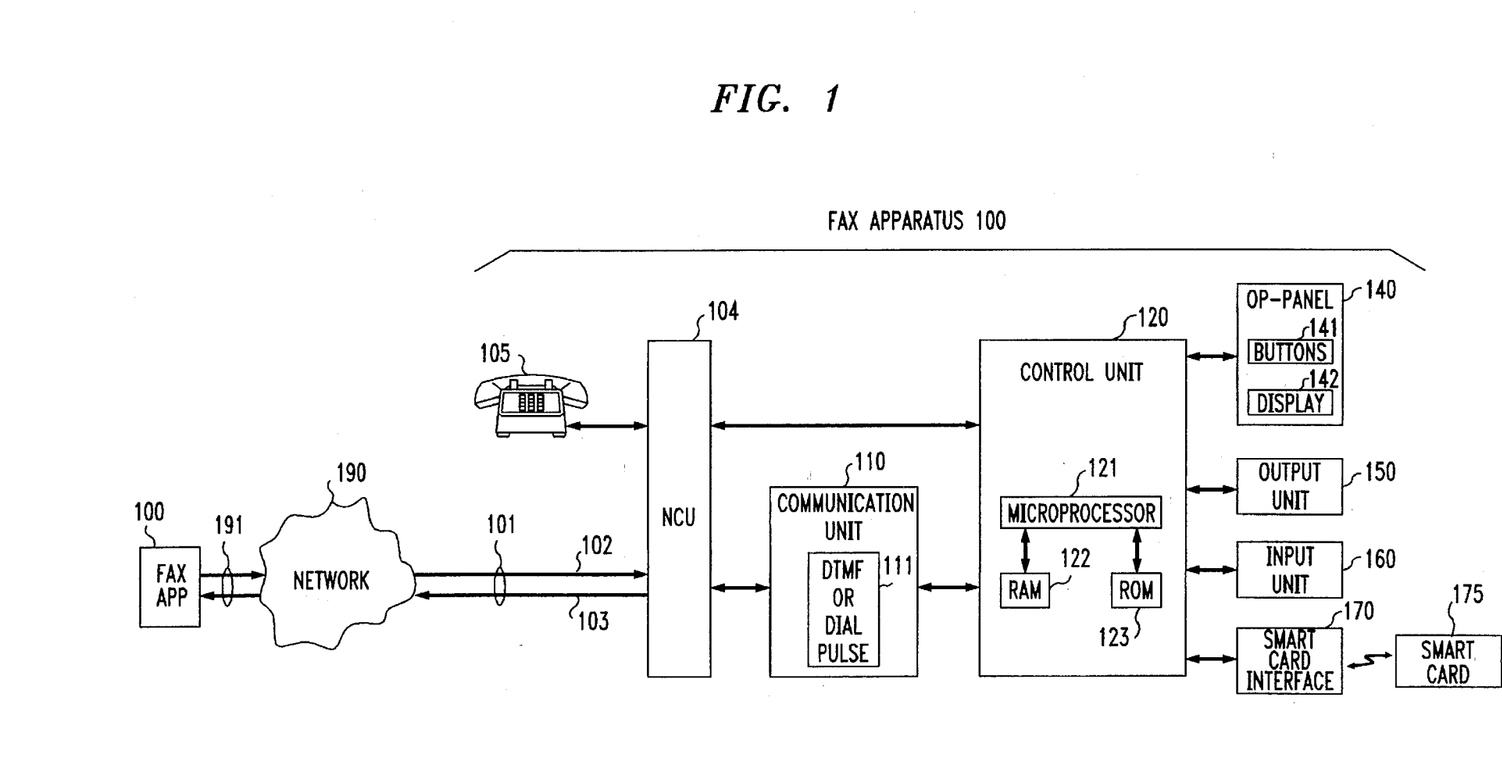
FIG. 1 shows an illustrative block diagram of a communication system and a facsimile apparatus in accordance with the present invention.

Shown in FIG. 1 is a block diagram of an illustrative network including two facsimile apparatuses 100 which connect to telephone switch network 190 via facilities 101 and 191. FIG. 1 also shows an illustrative block diagram of an embodiment of a facsimile apparatus 100 useful in describing the present invention. In the drawing, Network Control Unit (NCU) 104 controls in a known manner the interface to facility 101 which connects the facsimile apparatus to a telephone switch network 190. Facility 101 may be one duplex facility used both to send and receive facsimile messages or may be two simplex facilities 102 and 103, one to receive facsimile messages and one to dial-out over, respectively. NCU 104 enables signaling and voice communications, via telephone 105, and signaling and data communication, via communication unit 110 and control unit 120, between the facsimile machine 100 and the network 190.

The control unit 120 controls the overall facsimile apparatus 100 operation. Control unit 120 operates under program control to control the operations of NCU 104, communication unit 110, operator panel 140, output unit 150, and input or scanning unit 160. Control unit 120 includes a microcomputer 121, RAM 122 and ROM 123 which together store the data tables of FIG. 4 as well as the programs necessary to perform the standard facsimile functions and the various features and functions (FIGS. 2 and 3) of the present invention.

The communication unit 110 contains a modem for modulating and demodulating an image signal and a decoder/encoder for decoding and encoding the image signal. This unit also contains a Dual Tone Multi Frequency (DTMF) and dial pulse generator 111 which is used to dial outgoing calls.

The operator panel 140 contains buttons 141 (e.g., send button) or switches and a display 142 which enable the user to input information to and receive information from the facsimile apparatus.

The output unit 150 is typically a printer incorporated in the facsimile apparatus and is used in a well-known manner to generate a hard copy of the received facsimile message. The input or scanning unit 160 is used to read, in a well-known manner, the image of the document to be transmitted by the facsimile apparatus. The smart card interface (or reader) 170 enables any of a variety of smart cards to be utilized by the present invention. The smart card identifies the user and enables the user to retrieve his/her fax messages from facsimile apparatus 100. Illustratively, the smart card 175 and interface 170 may be a well-known AT&T smart card Computer Security System (CSS) adapted to implement the features of the present invention. The AT&T CSS is a user authentication system in which the user calls the system in the usual manner and the smart card responds to dynamic challenges from the system to prove the authenticity of the smart card. The user must then enter the proper PIN code to verify the user's authenticity. Only when the smart card and the user identity have been authenticated is access allowed to the system.

Figure 5:
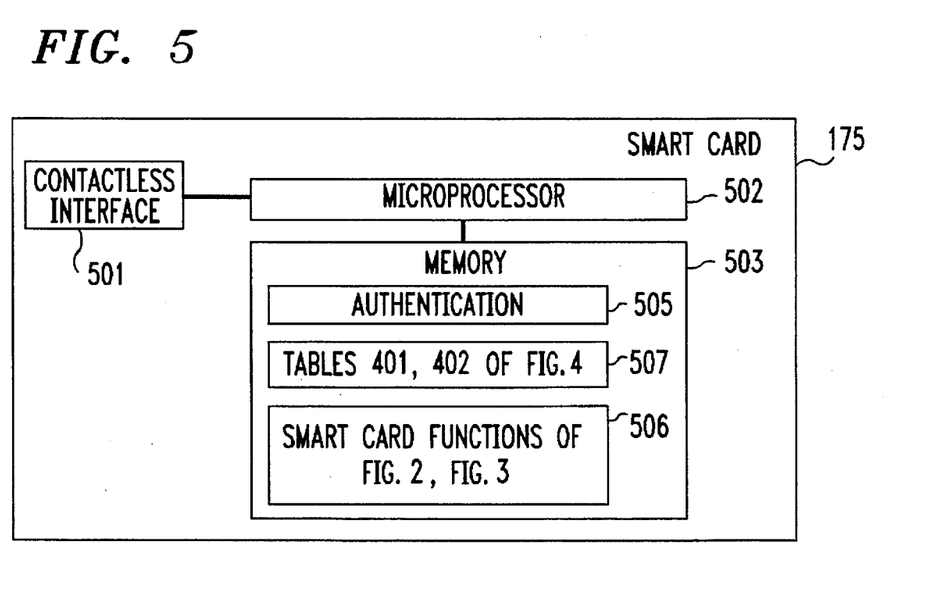
FIG. 5 shows a block diagram of a smart card utilized by the present invention.

Shown in FIG. 5 is an illustrative block diagram of smart card 175. The smart card 175 includes a contactless interface 501 which provides communication capability with the smart card interface 170. A microprocessor 502 connects to interface 501 and to memory unit 503 and controls the operation of smart card 175. The memory unit 503 includes programs for implementing the above-described CSS authentication functions 505 as well as decrypt programs 506 and Tables 507 utilized for performing the function of the present invention. Microprocessor 502 controls the smart card 175 to perform data manipulation, card authentication as well as reception, decryption and transmission of messages in accordance with the present invention.

Because the operations of the above-mentioned circuits of facsimile apparatus 100 of FIG. 1 are well known, their operation will not be further described. However, where the operation of any of these units is modified in accordance with the present invention, that unit's operation will be described more completely. Thus, using the figures and description of this specification as a guide, the operations of the present invention should be integrated into the hardware and program control structure of the facsimile apparatus so as to compatibly cooperate with other features and operations of the facsimile apparatus.

Figure 2:
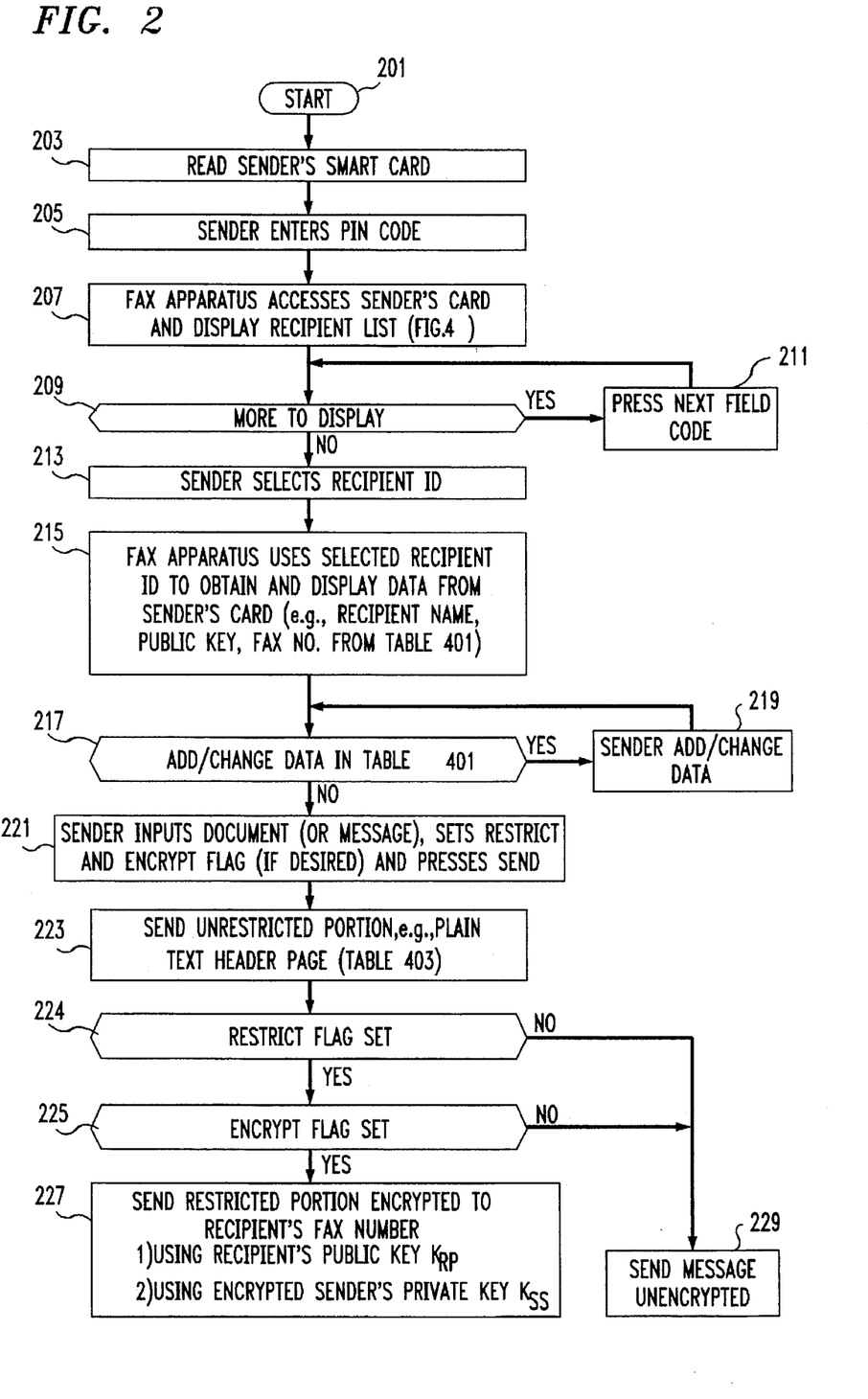
FIG. 2 is a flow chart showing the procedure for the transmission of a secure facsimile message.

Shown in FIG. 2 is a flow chart describing the transmission of a secure facsimile message. With joint reference to FIGS. 1 and 2, we describe the operation of a facsimile apparatus 100 in the transmit mode. In step 201, the procedure is started. In step 203, the sender inserts his or her smart card 175 into the smart card interface 170. The facsimile apparatus, in step 203, authenticates the sender's smart card, illustratively in the manner described in the AT&T CSS arrangement. In step 205, the sender enters a PIN code and the facsimile apparatus authenticates the sender's identity. Assuming that the smart card and sender's identity have been authenticated, in step 207 the facsimile apparatus accesses the sender's smart card and displays an address book (Table 401 of FIG. 4) on display 142. Table 401 includes a list of recipient names, facsimile numbers, telephone numbers and public keys. In step 209, if the size of Table 401 exceeds the display capability of display 142, the system permits the sender to step the display 142 to the next field or page of the addressee list. This is done in step 211.

Figure 4:
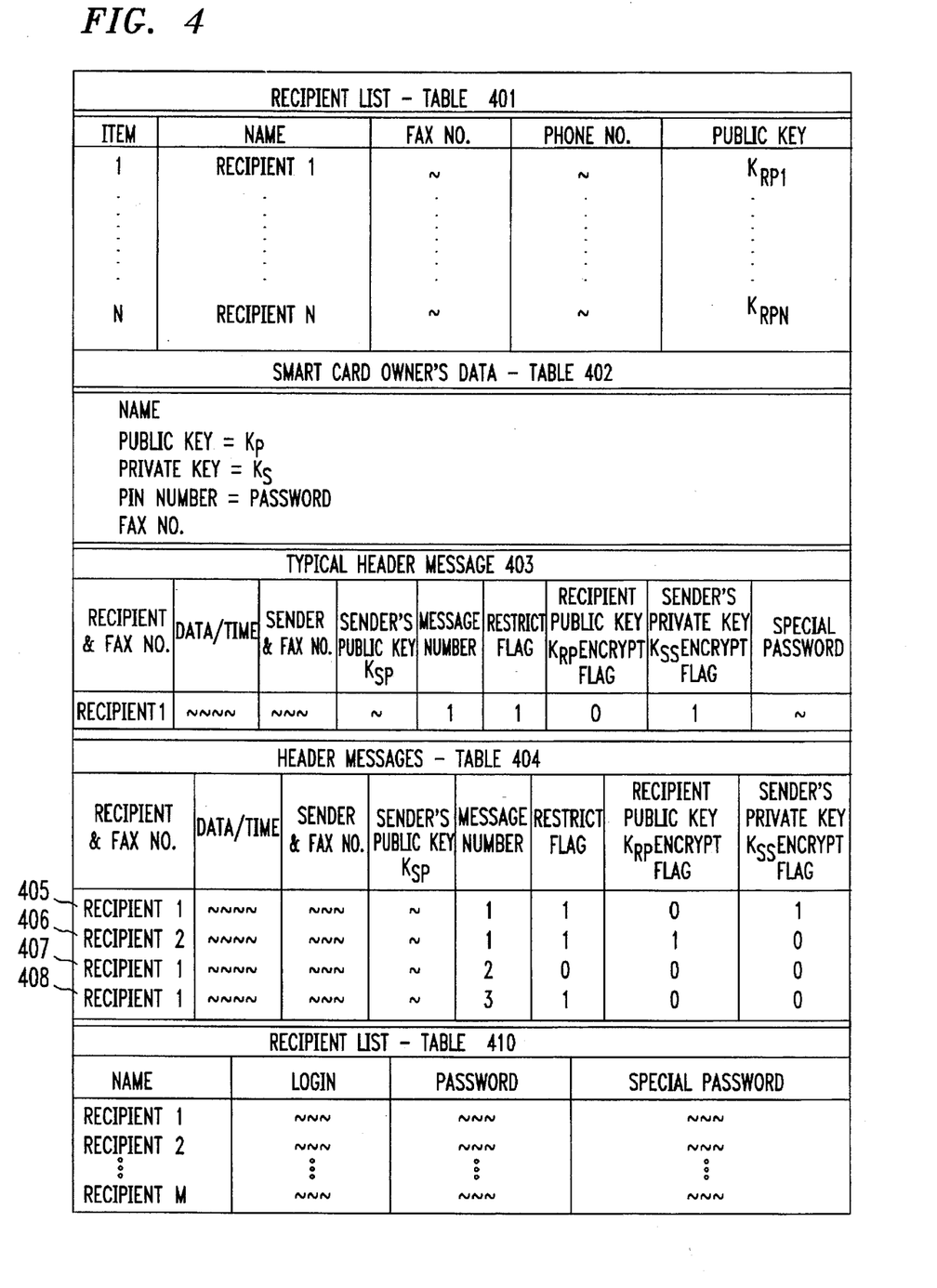
FIG. 4 shows illustrative data tables and messages utilized by the present invention.

In step 213, the sender selects the recipient to whom a facsimile message is to be sent. In step 215, facsimile apparatus 100 uses the selected recipient identification to obtain and display data from the sender's smart card 175 (Table 401). In step 217, the sender has an opportunity to add or change data in Table 401. In step 219, the sender adds or changes data in Table 401. In step 221, the sender inputs the document or message into the fax apparatus and, if appropriate, sets a restrict flag and encrypt flag (if it is desirable to restrict and encrypt the body of the transmitted fax message) and then presses the send button.

According to the invention, in step 223, the header portion of the message is sent unrestricted while the body of the message may be sent either unrestricted (restrict flag is 0) or restricted (restrict flag is 1). Moreover, a restricted message can be sent unencrypted (encrypt flag is 0) or encrypted (encrypt flag is 1). Additionally, encrypted messages may be encrypted in one of two different ways—for example, by using a recipient's public key $K_{RP}$ ($K_{RP}$ encrypt flag is 1) or by using a sender's private key $K_{SS}$ ($K_{SS}$ encrypt flag is 1). The actual encryption keys $K_{RP}$ and $K_{SS}$ are obtained, respectively, from Table 401 and Table 402. The restrict and encrypt flags are sent as part of the header message (see Table 403).

With reference to 403, there is shown an illustrative header message including data fields such as recipient's name and facsimile number, date/time, sender's name and facsimile number, sender's public key ($K_{SP}$), a message identification number, a restrict flag, recipient's public key encrypt flag ($K_{RP}$), and sender's private key encrypt flag ($K_{SS}$). If desirable, other special recipient passwords (special password) known only to the sender and recipient can be sent to the receiving fax apparatus, as part of the header message, and stored as other data in the recipient Table 410. This information would not, however, be outputted to Table 404. This special password could be used to further verify the identity of the recipient, prior to outputting the restricted portion of the message to the recipient.

In step 224 it is determined if the restrict flag is set. If it is not set, then in step 229 the document or message is sent unencrypted. In step 224, if the restrict flag is set, then in step 225 it is determined if the encrypt flag is set. If it is not, then in step 229 the sender's document or message is sent unencrypted. If either the $K_{RP}$ or $K_{SS}$ flag is set, then in step 227 the header message is sent unencrypted and the document or body of the message is sent encrypted, using the appropriate recipient's public key $K_{RP}$ or the sender's private key $K_{SS}$. When the document or message is encrypted, it is transmitted over the facility as a random sequence of data bits to the receiving fax apparatus or any apparatus monitoring the facility. This random sequence of data bits can only be encrypted when the proper key is used, as will be described in later paragraphs.

Figure 3A:
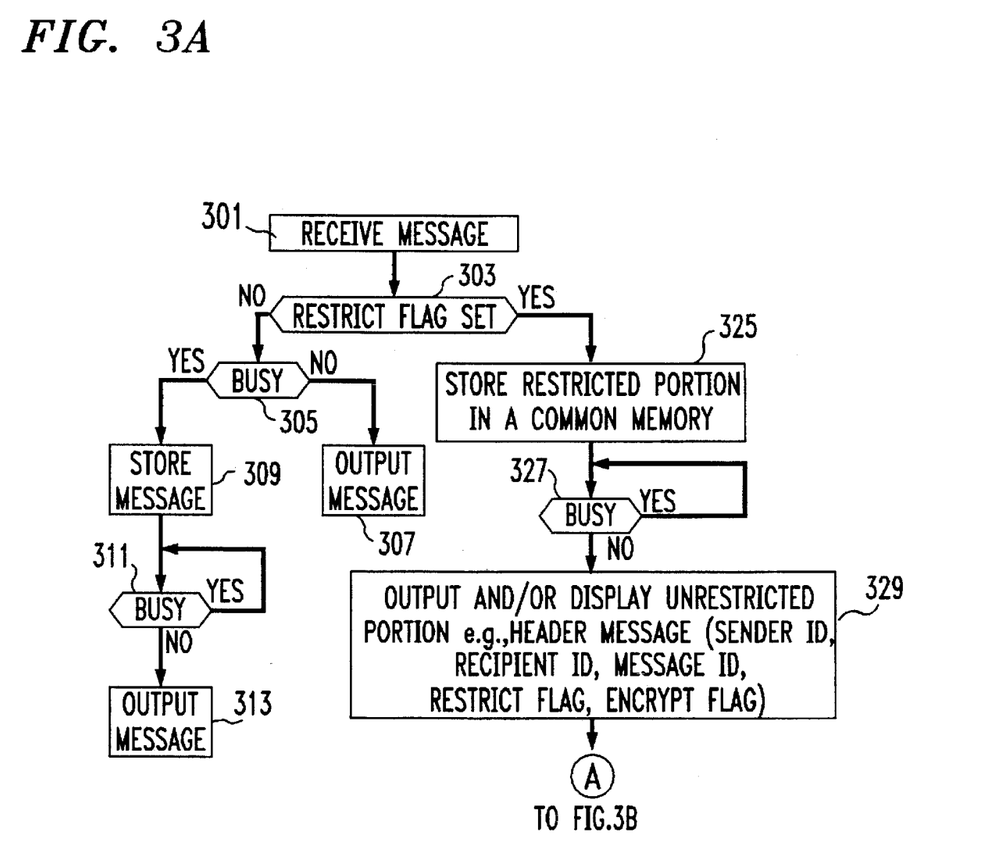
FIGS. 3A and 3B are flow charts describing the sequence of operations for a secure receiving facsimile apparatus.

With joint reference to FIGS. 1 and 3A, we describe the operation of a facsimile apparatus 100 while in the receive mode. In step 301, the facsimile message is received. Shown in Table 404 is a listing of header messages which are displayed or printed at fax apparatus 100. Each header message is associated with a fax message or document received by fax apparatus 100. In step 303, it is determined if the received fax message, e.g., 405, has a restricted portion (by checking the restrict bit of the header message). If there is no restricted portion (e.g., as in message 407), then in step 305 the fax apparatus determines if the printer output unit 150 is busy. If it is not busy, the header message of Table 404 the facsimile message are outputted in step 307. If, however, the printer unit 150 is busy, then in step 309, the fax apparatus 100 stores the facsimile message. Thereafter, in step 311, the facsimile apparatus determines whether or not the printer 150 is busy. If it is busy, control returns to step 311 until the printer unit 150 is no longer busy, at which time the message is outputted in step 313.

Figure 3B:
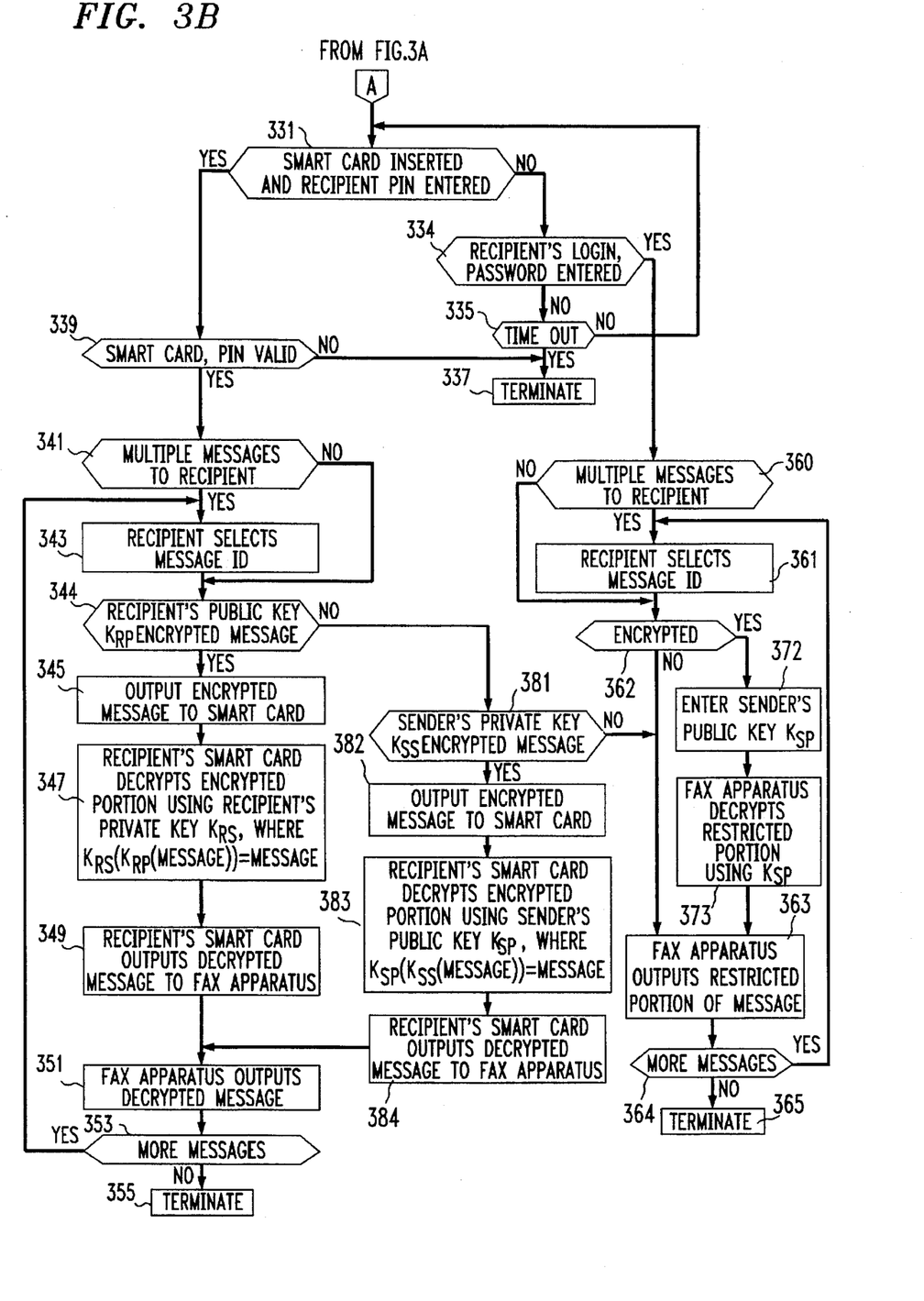

Returning to step 303, if it is determined that the received message is restricted (such as messages 405, 406, or 408), then in step 325 the restricted message is stored in memory (RAM 122) and associated with the appropriate header message of Table 404. In step 327, it is determined if the printer unit is busy. When the printer unit 150 is not busy, then in step 328 the apparatus outputs and/or displays the header message, illustratively in the form shown in Table 404. In FIG. 3B, step 331, the user or recipient inserts his/her smart card 175 into smart card interface 170 and enters his/her PIN number via operator panel 140. (While the following description describes a recipient as the user of the fax apparatus, a user knowing a recipient's login and password or having a recipient's smart card and PIN number could also use the fax apparatus.) If the recipient has properly inserted his/her smart card and entered the proper PIN number, then in step 339 the validity of the smart card and PIN is determined. (This is accomplished using authentication programs stored in facsimile apparatus 100 and smart card 175.) If the smart card and PIN number are not valid, then the operation is terminated in step 337. If the smart card and PIN number are valid, then control proceeds to step 341.

Each header message 405–408 of Table 404 may include entries for all of the data fields. In the event there have been several messages received for different recipients, as is shown in Table 404, the operator panel 140 includes buttons for enabling a recipient to select his/her messages for output from the plurality of messages listed in Table 404. In step 341, the recipient determines if he/she has multiple messages. If the recipient does not have multiple messages, control passes to step 344; otherwise control passes to step 343. In step 343, the recipient selects which of his/her received messages is to be outputted. In step 344, fax apparatus 100 determines if the selected message is encrypted using the recipient's public key $K_{RP}$ (i.e., by checking the status of $K_{RP}$ flag). If the selected message is encrypted using the key $K_{RP}$ (such as message 403 in Table 404), then control passes to step 345. In step 345, the selected message is outputted via smart card interface 170 to smart card 175.

The smart card 175 (with joint reference to FIGS. 3 and 5) illustratively receives the encrypted message via contactless interface 501. Microprocessor 502 obtains the recipient's private or secret key $K_{RS}$ from memory 503 and decrypts the encrypted message using key $K_{RS}$. As noted, recipient's public key $K_{RP}$ was used to encrypt the transmitted facsimile message. The keys $K_{RP}$ and $K_{RS}$ each represent encryption functions that are inverses of each other. As previously noted, a random sequence results when a message is encrypted with the encryption function of key $K_{RP}$. When the decrypt function of $K_{RS}$ is applied to the message encrypted using function $K_{RP}$, the original message results. Thus, mathematically $K_{RS} \times K_{RP}$ (original message)= the original message. Such an encryption arrangement is described in U.S. Pat. No. 4,590,470 issued on May 20, 1986 to A. R. Koenig, which patent is incorporated by reference herein. In a similar manner, a message encrypted using sender's private key $K_{SS}$ can be decrypted only by using the sender's public key $K_{SP}$.

Thus, in step 347, when microprocessor 502 applies the key $K_{RS}$ to a message that has been encrypted using the recipient's public key $K_{RP}$, the resulting decrypted message is the original message sent by the sender. Thereafter, in step 349 the recipient's smart card 175 outputs the decrypted message via the smart card interface 170 to fax apparatus 100. In step 351, facsimile apparatus 100 outputs the decrypted message via printer unit 150. In step 353, the recipient determines if there are additional messages for the recipient. If there are, then control returns to step 343, otherwise the receive mode is terminated in step 355.

Returning to step 344, if the $K_{RP}$ flag is not set, then step 381 is performed. In step 381, fax apparatus 100 determines if the selected message is encrypted using the sender's private key $K_{SS}$ (by checking if the $K_{SS}$ flag is set in the selected header message of Table 404). If yes (such as with message 405 of Table 404), then in step 382, the encrypted message is outputted to smart card 175. In step 383, the smart card 175 decrypts the encrypted message using the sender's public key $K_{SP}$ to obtain the original message. In step 384 the smart card 175 outputs the decrypted message to fax apparatus 100. Thereafter fax apparatus 100 outputs the decrypted message in step 351 as previously described.

Returning to step 381, if the $K_{SS}$ flag is not set, then the restricted portion of the fax message was not encrypted (e.g., such as message 408 of Table 404 where both the $K_{RP}$ and $K_{SS}$ flags are not set), and control returns to step 363. In step 363, the fax apparatus outputs the unencrypted restricted portion of the message via printer 150. In step 364 it determines if more messages exist. If more messages exist, control returns to step 330; otherwise the received procedure is terminated in step 365.

Returning to step 331, if the recipient has not inserted the smart card in step 331, then step 304 is performed. In step 334, the recipient must enter his/her login and password and other information (such as the special password of message 403, if appropriate). If the login and password are not correctly entered, then fax apparatus 100 determines, in step 335, whether or not it should time out. If it does not time out, control returns to step 331. If a time out has occurred, then fax apparatus 100 terminates the operation in step 337. Note, even after termination, fax apparatus 100 may continue to display the header messages of Table 404 to identify messages previously received for each recipient. Obviously, a recipient can select his/her messages for retrieval at any time. Thus, step 331 need not immediately follow step 329.

In step 334, the recipient's login and password (and, optionally, other special passwords, if utilized) are checked by comparing them with the data entered in Table 410. If correctly entered, then in step 360 the recipient checks if multiple messages exist. If only one message exists, then step 362 is performed; otherwise, the recipient selects the desired message in step 361 and then step 362 checks if the restricted message is encrypted. Note, for security reasons, we assume that the message was encrypted using the sender's private key $K_{SS}$, since then the user only has to enter the sender's public key $K_{SP}$ to decrypt the message. (If the restricted message was encrypted using the recipient's public key $K_{RP}$, the recipient would then have to enter his/her private key $K_{RS}$ into apparatus 100. Such an arrangement may be less secure to the recipient.)

Returning to step 362, if the $K_{SS}$ flag is set, then in step 372 the recipient enters the sender's public key $K_{SP}$. In step 373, fax apparatus 100 decrypts the restricted message, using key $K_{SP}$, to obtain the original message. That is, $K_{SP} \times K_{SS}$ (message)=the original message sent by the sender. Thereafter, in step 363, fax apparatus 100 outputs the decrypted restricted message via printer unit 150. If more messages exist, in step 364 control returns to step 361; otherwise, the receive mode is terminated.

Returning to step 362, if the $K_{SS}$ flag is not set, then the restricted message does not need to be decrypted. Hence, in step 363, the fax apparatus 100 outputs the restricted portion of the message. Processing continues from step 363 in the manner previously described.

What has been described is merely illustrative of the application of the principles of the present invention. Other arrangements and methods can be implemented by those skilled in the art without departing from the spirit and scope of the present invention.

We claim:

1. A communication apparatus for receiving a sender's message over a facility comprising means for receiving and storing the message including an unrestricted portion and a restricted encrypted portion, first output means for outputting the unrestricted portion of the received message to a user, the unrestricted portion including information identifying an encryption key used to encrypt the restricted portion, second output means, responsive to predetermined information received from the user, for outputting the restricted portion of the message to the user, a smart card interface means and wherein said predetermined information includes a user-entered person identification number (PIN) entered after the user's smart card is inserted into said interface, means responsive to said received PIN for enabling said interface means to output said encryption key identification information and said restricted encrypted portion to said smart card for use in decrypting said restricted encrypted portion by said smart card and wherein said interface means receives a decrypted restricted portion from said smart card, via said interface, for output via said second output means.

2. The communication apparatus of claim 1 the unrestricted portion includes information indicating whether or not the restricted portion is encrypted.

3. The communication apparatus of claim 2 wherein the unrestricted portion includes information indicating a type of encryption key used to encrypt the restricted portion.

4. The communication apparatus of claim 1 wherein a plurality of messages are received and wherein the unrestricted portion includes recipient identification for each received message and wherein said predetermined information identifies the user as the recipient in at least one of the plurality of fax messages to be outputted to the user.

5. The communication apparatus of claim 1 wherein said communication apparatus is a fax apparatus.

6. The communication apparatus of claim 1 wherein said communication apparatus is a multi-media apparatus.

7. A communication apparatus for transmitting a message over a facility, comprising first input means for receiving a first user input to be transmitted as a message, second input means for receiving a second user input requesting that the message delivery be restricted to an intended recipient, and requesting that the message be encrypted using a user-selected encryption key selected from a plurality of predetermined encryption keys, means, responsive to said second user input, for sending a message including an unrestricted portion and a restricted portion, the unrestricted portion being arranged to be outputted to a recipient at a receiving location for identifying an intended recipient and one or more encryption flags indicating said user-selected encryption key used to encrypt the restricted portion.

8. The communication apparatus of claim 7 wherein said user-selected encryption key is the intended recipient's public key $K_{RP}$ as indicated by said one or more encryption flags.

9. The communication apparatus of claim 7 wherein said user-selected encryption key is the user's private key $K_{SS}$ as indicated by said one or more encryption flags.

10. The communication apparatus of claim 9 wherein the user's public key is sent as part of the unrestricted portion of the message.

11. The communication apparatus of claim 7 further including a smart card interface and wherein said second user input includes recipient information received from a smart card inserted into said interface.

12. The communication apparatus of claim 7 further comprising a smart card interface for displaying an address book of a smart card inserted therein, the address book being used by the user to select the intended recipient.

* * * * *